July 25, 1933.　　　F. X. GOVERS　　　1,920,126
FILTRATION
Filed Jan. 25, 1932　　5 Sheets-Sheet 3

FRANCIS X. GOVERS
INVENTOR

BY R. J. Dearborn
HIS ATTORNEY

FRANCIS X. GOVERS
INVENTOR
BY R. J. Dearborn
HIS ATTORNEY

July 25, 1933.　　　F. X. GOVERS　　　1,920,126
FILTRATION
Filed Jan. 25, 1932　　　5 Sheets-Sheet 5

FRANCIS X. GOVERS
INVENTOR

BY R. J. Dearborn
HIS ATTORNEY

Patented July 25, 1933

1,920,126

UNITED STATES PATENT OFFICE

FRANCIS X. GOVERS, OF VINCENNES, INDIANA, ASSIGNOR TO INDIAN REFINING COMPANY, OF LAWRENCEVILLE, ILLINOIS, A CORPORATION OF MAINE

FILTRATION

Application filed January 25, 1932. Serial No. 588,586.

This invention relates to filtration and particularly to an improved apparatus for separating solids from liquids.

The invention contemplates the filtration of solids or semi-solids from liquids wherein the solid materials are separated under pressure to form a cake substantially free from mother liquor and which is then subjected to washing in situ to remove adhering mother liquor.

More particularly, the invention contemplates a filter press having hollow rotating filter elements, with relatively close spacing between the elements, and in which resulting spaces solids are deposited in the form of a filter cake, while filtrate liquid flows into the interior of the hollow elements and is withdrawn therefrom. The spaces between the elements are adapted to be completely filled with solids which may advantageously be subjected to fluid pressure therein to form a relatively dry cake. For the purpose of washing the cake so formed, provision is made for introducing washing fluid to the interior of alternate elements whereby it is applied uniformly over the entire surface of one side of the cakes and passes through the cakes into the interior of the adjacent and remaining elements, thus producing a cake substantially completely free from mother liquor.

An object of my invention is the design of an improved filter apparatus adapted for filter-pressing cold wax-bearing mineral oil for the separation therefrom of wax in the form of a substantially dry cake which may be subjected to washing with a suitable solvent or wash liquid prior to discharge from the press in order to remove adhering oil, and thereby resulting in the production of a readily sweatable wax after the retained solvent wash liquid has been removed by evaporation.

In the prior art, the separation of wax from wax distillates has been carried out in a filter press of the ordinary plate and frame type. In this type of press, the mixture is introduced to the spaces between the plates through ports at the center thereof, and spreads outwards radially therefrom, the solids being deposited between the plates, while the liquid diffuses through the deposited solids to drip from the peripheral edges of the plates. As deposition of the solids within the spaces proceeds, resistance to flow of the liquid correspondingly increases so that towards the end of the filtering step, the cake is subjected to relatively high pressure of from 40 to 100 pounds or more, which pressure has the effect of compressing the deposited solids to form a relatively dry cake.

In this type of press, washing of the cake is precluded for the reason that the washing liquid introduced to the center of each cake must, of necessity, diffuse radially through the cake from its center to its periphery. The passage of the solvent or wash liquid through such a depth of wax militates against effective washing and removal of the entrained oil and, in any case, there is a very great tendency for the washing liquid to short circuit.

In the usual type of rotating leaf press wherein the spacing between the leaves is in excess of the thickness of the cake formed therebetween, there is usually a tendency for particles of the cake to be dislodged and fall from the filter surface during the initial introduction of the wash liquid to the filter, whereupon such liquid will short circuit through such openings in the cake and complete washing of the cake is thus impossible.

The apparatus of my invention combines the characteristic features of a rotating leaf filter and those of a plate and frame press with the additional feature of provision for effectively washing the solids deposited on the filter surfaces in the form of a cake. That is to say, the provision of rotating leaves facilitates uniform deposition of the solids over the filter surface and permits the easy and rapid discharge of the solids from the filter, while due to the particular form of construction of my filter, the deposited solids may be subjected to relatively high pressures characteristic of a plate and frame press, thereby forcing out of the cake the bulk of the mother liquor otherwise tending to remain in the cake.

By employing hollow filter leaves with means for introducing washing liquid to the interior of alternate leaves, or every second leaf, the washing liquid so introduced has ready access to the entire surface of one side of each cake rather than to one point at the center of the cake, as would be the case in the usual plate and frame type of press. Consequently, where the wash liquid is applied to the entire side of the relatively thin cake, maintained between adjacent filtering surfaces, there is substantially no tendency towards short circuiting of the liquid, and the entire cake is subjected to a uniform and complete washing.

In order to better describe the invention, reference will now be made to the accompanying drawings forming a part of the specification in which.

Referring to Figs. 1, 2, 3 and 4, a hollow shaft 1, closed at one end, extends axially through the filter, the ends projecting through the filter body being supported in bearings 2 mounted on suitable masonry supports.

Figure 2:
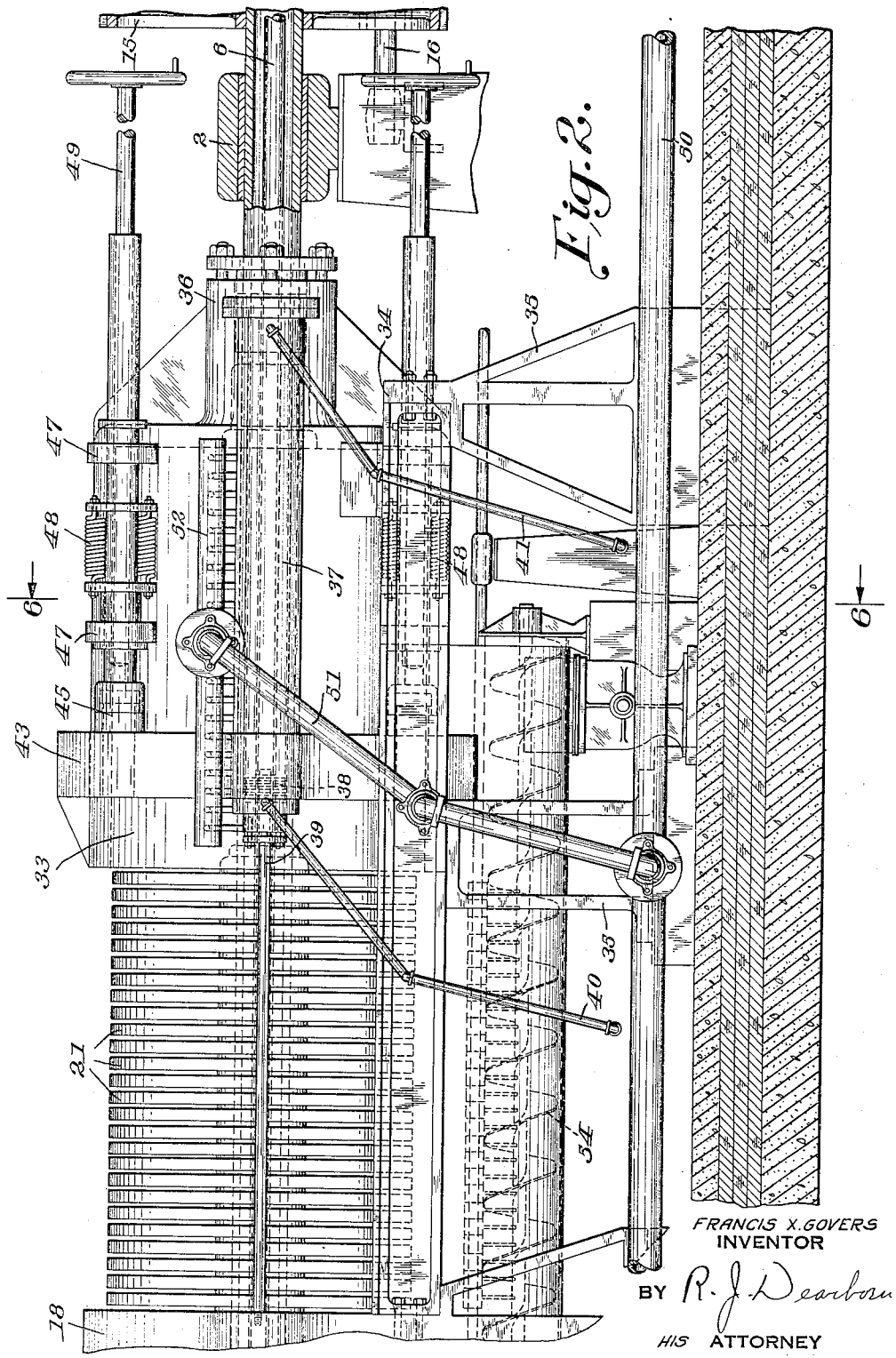
Figure 3:
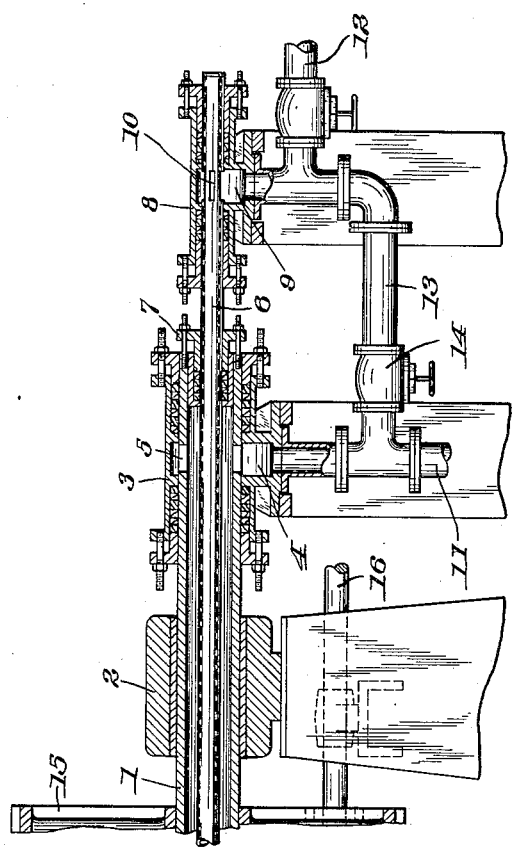
Fig. 3 is a sectional view of a portion of the hollow shaft extending axially through the filter and providing means for discharging the filtrate and introducing a filter cake washing liquid to the filter.

As shown in Figs. 2 and 3, one end of the shaft 1 terminates in a double-ended stuffing box 3, the stuffing box having a port 4 adapted to communicate with corresponding openings or ports 5 about the circumference of the shaft and short of its end.

Pipe 6 extends concentrically through the hollow shaft 1 and is rigidly supported therewithin. The ends of the pipe 6 are closed and one end thereof projects through a stuffing box 7 provided within the open end of shaft 1 (Fig. 3). The projecting end of pipe 6 also terminates in a double-ended stuffing box 8 substantially similar to the box 3, having a port 9 adapted to communicate with corresponding ports 10 in the pipe 6.

Ports 4 and 9 communicate respectively with pipes 11 and 12 which are also manifolded together by a pipe 13 having a valve 14. A gear wheel 15 is rigidly secured to the shaft 1 adapted to be driven from a gear on a driving shaft 16 and by which means the shaft 1 is rotated.

Figure 4:
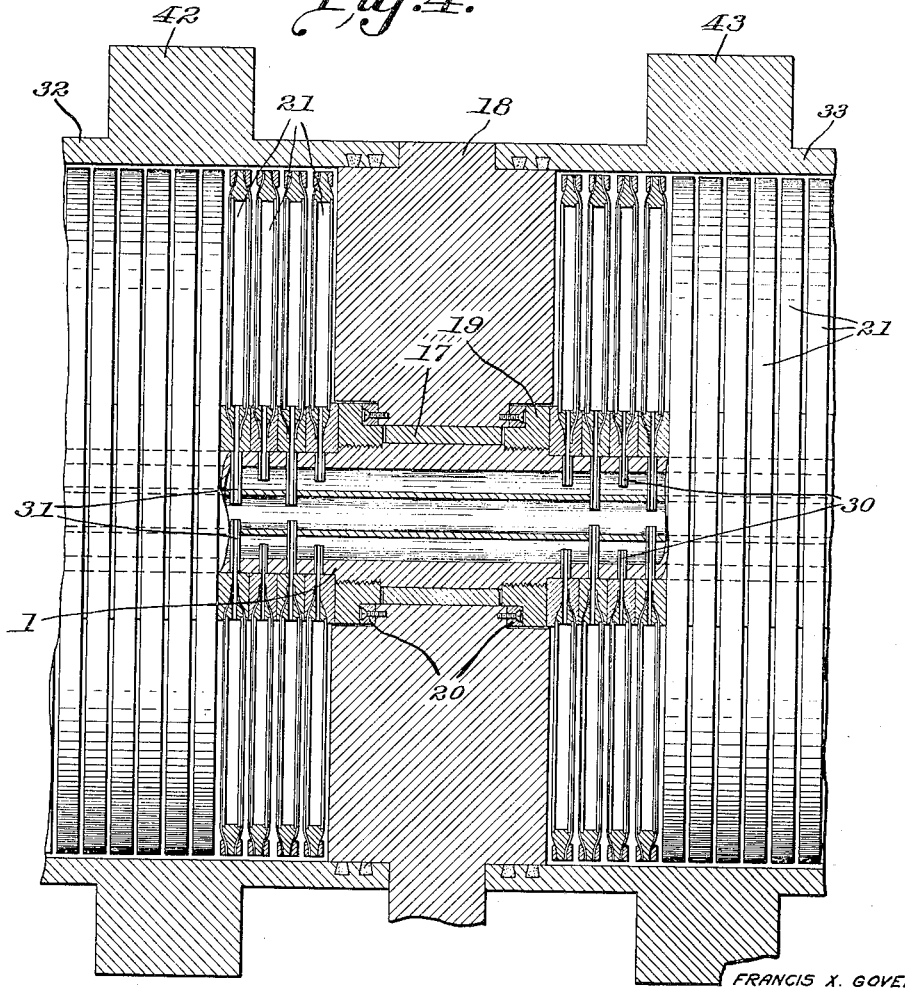
Fig. 4 is a sectional view of the mid-section of the filter shell.

As shown in Fig. 4, the shaft 1 is supported at its mid-point by a bearing 17 formed within the stationary mid-section 18 of the filter body. Flanges 19 are threaded on to the shaft 1 adapted to engage thrust bearing surfaces 20 provided at either end of the bearing 17 and adapted to prevent lateral movement of the shaft 1.

Figure 6:
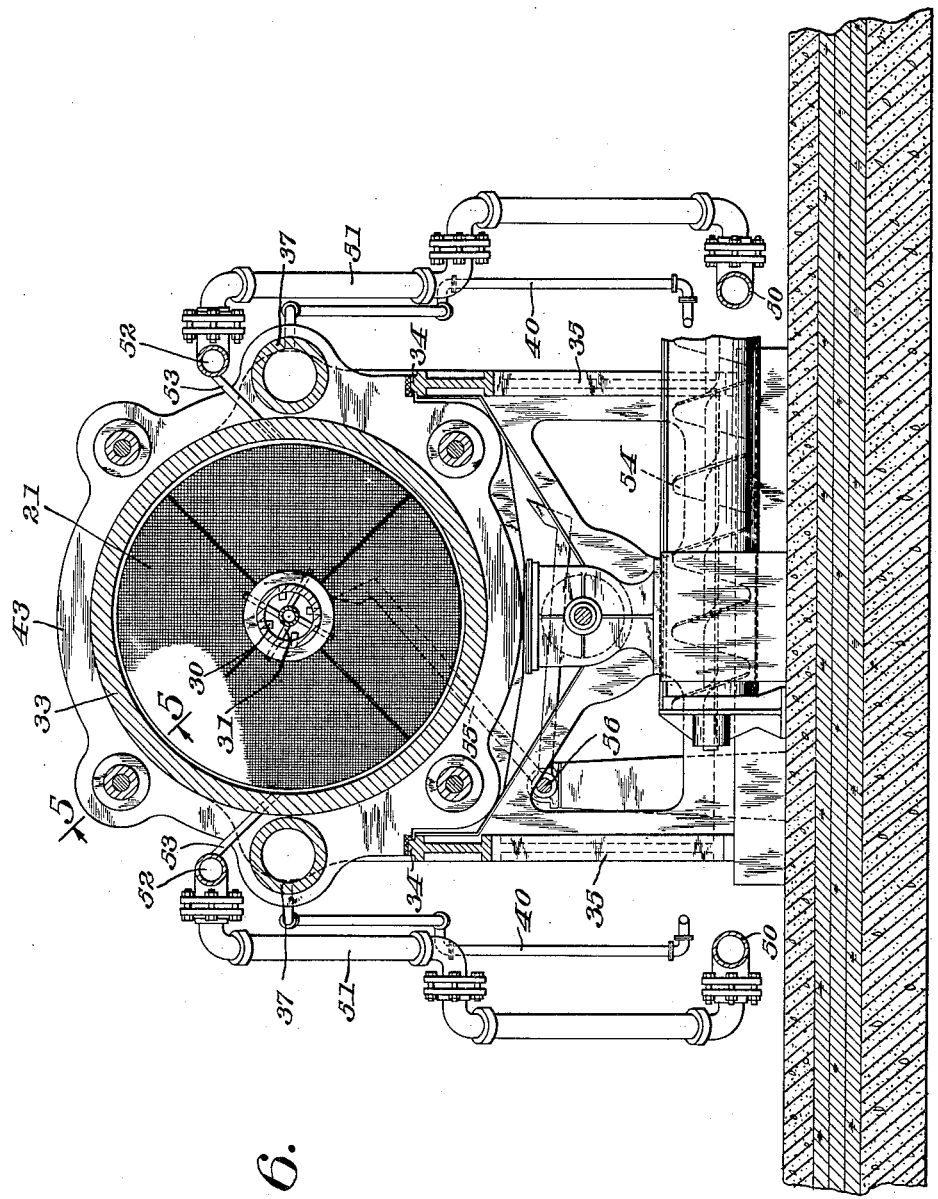
Fig. 6 is a sectional view of the filter taken along the line 6—6 of Fig. 2.

Hollow filter leaves 21 are mounted on the shaft 1 secured thereto by suitable means not shown so that they rotate with the shaft. As shown in Fig. 6, the filter leaves may comprise several segments or sections overlaid with a suitable fabric material. Each leaf section is provided with a conduit 30 forming communication between the interior of the leaf section and the interior of the hollow shaft 1. The ends of the conduits projecting into the interior of the shaft may be capped, or the conduits may be arranged at angles relative to each other as shown, so that the drip from one conduit will not fall into another as the shaft and leaves rotate.

Conduits 31 are also provided to communicate between the pipe 6 within the hollow shaft 1 and the interior of each section of alternate filter leaves.

The spacing between leaves is advantageously quite small, say of the order of about one-half inch. The outer shell of the filter which encloses the leaves during filtration comprises two horizontal cylindrical sections 32 and 33 slidably supported on fixed bearings 34 which latter are, in turn, mounted upon structural steel supports 35 resting on a masonry foundation as shown.

The sections 32 and 33 are closed at their outer or remote ends and stuffing boxes 36 are provided therein through which the ends of the shaft 1 project. The inner or adjacent ends of the sections 32 and 33 are adapted, when closed, to seat against the stationary mid-section 18, the contiguous surfaces being planned off to form a liquid-tight joint when the filter shell is closed.

Hydraulic opening and closing means are provided for each section comprising cylinders 37 secured on the sides of each section with a stationary piston 38 therewithin secured to a piston rod 39, the end of which projects through a stuffing box in one end of the cylinder and is secured to the stationary mid-section 18 of the filter.

Pipes 40 and 41 provide means for introducing an actuating fluid from a source not shown to the cylinders on either side of the pistons, depending upon whether it is desired to open or close the filter shell sections.

Figure 5:
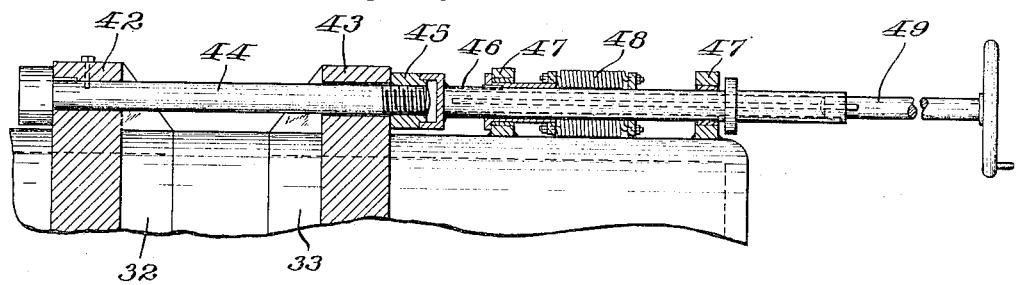
Fig. 5 illustrates a locking mechanism adapted to lock the movable shell sections in a closed position.

Referring to Fig. 5, shoulders 42 and 43 are formed about the shell sections near their adjacent ends through which holes are formed at regular intervals. Bolts 44 are inserted through the holes in the shoulder 42 secured therein by set screws or other means. The threaded ends of the bolts 44 project through corresponding holes in the shoulder 43 when the shell sections are in a closed position. A locking nut 45 adapted to engage the threaded ends of the bolts 44 is held in position by shaft member 46 slidably and rotatably supported in bearings 47 on the exterior of the shell section 33. Tension springs 48 are provided to maintain the member 46 and the nut 45 constantly in position for engagement with the threaded ends of the bolts 44. A shaft 49 with a hand wheel secured thereto extends into the hollow shaft 46 and is adapted to engage the shaft for the purpose of screwing the nuts 45 on or off the bolts 44.

Figure 1:
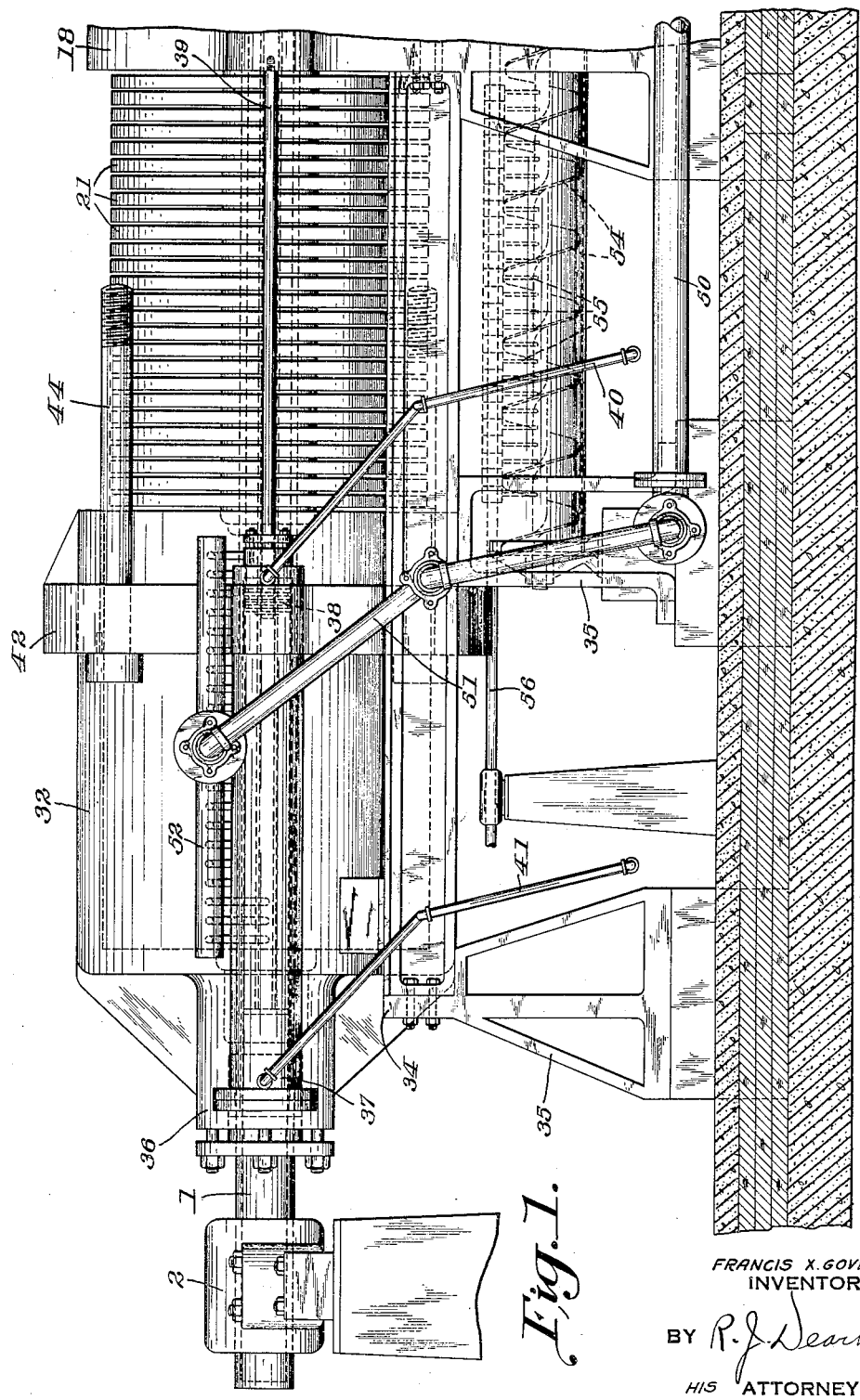
Figs. 1 and 2 represent a longitudinal view of the filter in two sections.

The fluid material to be filtered is conducted to the filter from a main feed pipe 50 and flexible connections 51 leading to manifolds 52 on each side of a shell section as shown in Figs. 1, 2 and 6. A plurality of branch pipes 53 lead from each manifold through the wall of the shell section and are adapted to discharge the fluid into the interior of the shell within the spaces between the filter leaves. These branch pipes are advantageously directed downwards so as to subject fluid within the filter shell to stirring action and thus prevent settling.

A screw conveyor 54 is provided beneath the body of the filter which is adapted to collect the filter cake discharge from the filter leaves and deliver it to suitable receiving means not shown. Scrapers 55 (see Fig. 6) secured to a rotatably supported shaft 56 and adapted to extend into the spaces between the filter leaves are provided for the purpose of facilitating removal of the cake. These scrapers are arranged to swing down away from the filter leaves to permit closing the shell sections.

I will now describe the practice of my invention in connection with the separation of wax from wax distillate which has been mixed with a selective solvent liquid such as a mixture of about 35% acetone and 65% benzol. The mixtures of wax distillate and solvent liquid may, for example, be in the proportion of about 30 parts distillate to 70 parts of solvent liquid mixture, and the resulting mixture is chilled to a temperature of around 0° F. or lower to precipitate the wax constituents.

This mixture, while maintained in a cold condition, is introduced to the filter from a source not shown through the charge pipe 50, the shell sections 32 and 33 of the filter being locked together in a closed position while the filter leaves are rotated. From the pipe 50, the cold mixture flows through the flexible feed pipes 51 into the manifolds 52. From these manifolds, the mixture is distributed through the small branch pipes 53 into the spaces between the filter leaves within the filter shell. Obviously, the filter apparatus is kept in a cold room in order to maintain the filtering mixture in a cold condition.

The solid hydrocarbons are deposited in the spaces between the leaves while the liquid hydrocarbons pass on to the interior thereof. The liquid accumulating within the leaves is discharged from the conduits 30 in each leaf section, while each section is in an inverted position during the rotation of the leaf. The liquid flows from the conduits 30 into the interior of the hollow shaft 1 from which it is withdrawn through the ports 5 in the end thereof, communicating with the discharge port 4 in the double-ended stuffing-box 3 and which leads to the discharge pipe 11.

As the introduction of cold mixture to the filter is continued, the spaces between the filter leaves gradually become filled with solid hydrocarbons as a result of which increase in the deposition of solid hydrocarbons, the resistance to flow of the liquid therethrough increases. The introduction of the cold mixture is, therefore, continued until the pressure within the filter has reached a predetermined point, which may range from around 20 or 30 pounds to as high as 100 pounds. This pressure has the effect of subjecting the deposited solids to compression, thus driving out the entrained liquid and tending to form a substantially dry cake.

When the desired pressure has been reached, the further introduction of discharge to the filter is discontinued and fresh solvent mixture is then introduced through the pipe 12 leading from a source not shown to the pipe 6 within the hollow shaft 1. The solvent liquid flows from the pipe 6 through the conduits 31 into the interior of the sections of alternate filter leaves. In this way, the entire space within the filter leaf may be filled with solvent liquid which diffuses through the cakes on both sides of the leaf in question, and into the interior of the leaf on either side. From the interior of these latter leaves, the solvent flows through the conduits 30 from each section into the interior of the hollow shaft 1 from which it is withdrawn in the same manner as the filtrate was withdrawn. The passage of the wash liquid through the cake is continued until the last traces of mother liquor are removed therefrom.

The shell sections of the filter are then unlocked and opened by means of the hydraulic cylinders 37. The scrapers 55 are then brought into engagement with the filter cake between the rotating filter leaves and the cake discharge therefrom into the screw conveyor 54 by which it is conducted to suitable receiving means. Following complete removal of the filter cake from the spaces between the leaves, the press is closed up again ready for further use.

While I have described the working of the press as applied to the separation of solid hydrocarbons from liquid hydrocarbons, and the washing of the separated solids, the filter press and process is also of great advantage in the filtration and washing of chemical products such as Blanc fixe (barium sulphate), dye compounds, such as Satin white, Reflex blues, Prussian blue, etc.

Obviously many modifications and variations of the invention, as hereinbefore set forth, may be made without departing from the spirit and scope thereof, and therefore only such limitations should be imposed as are indicated in the appended claims.

I claim:

1. In a filter press a shell, a plurality of hollow filter leaves spaced apart and rotatably supported within the shell, means for rotating the leaves, means for introducing a mixture of liquid and solids to the spaces between the exterior surfaces of the filter leaves upon which solids are deposited while the filtrate flows into the interior of the leaves, means for continuously withdrawing the filtrate therefrom during rotation of the leaves, means for introducing cake washing liquid to the interior of alternate leaves during their continued rotation, and means for withdrawing the wash liquid, after passage through the cake, from the interior of adjacent leaves.

2. A filter press for separating solids from liquids and adapted to permit washing the separated solids in situ, comprising a cylindrical shell, a hollow rotatable shaft extending axially through said shell, hollow filter leaves rigidly secured to said shaft at their centers and spaced a short distance apart, means for rotating said hollow shaft and filter leaves attached thereto during filtration and filter cake washing, conduits communicating between the interior of the shaft and the interior of the leaves adapted to form a filtrate discharge therefrom, a pipe extending axially through the hollow shaft and integrally supported therewithin, conduits communicating between said pipe and the interior of alternate leaves adapted to conduct washing liquid thereto, means for withdrawing filtrate from the interior of the leaves through the hollow shaft during filtration, means for introducing cake washing fluid to the pipe within the shaft during cake washing, and means for withdrawing the washing liquid, after its passage through the cake, from the interior of adjacent leaves.

3. In a filter press an outer shell comprising two horizontal cylindrical sections closed at their outer remote ends and slidably supported upon a stationary base, means for moving the shell sections over the stationary base into and out of a closed position to permit discharging solids therefrom, a series of hollow filter leaves rotatably supported within, and independently of, the filter shell, means for rotating the filter leaves, means for introducing a mixture of solids and liquids to the filter shell, means for removing filtrate from the interior of the leaves while leaving solids in the form of cake on the exterior surfaces of the leaves, and means for introducing cake washing liquid to the interior of alternate leaves and withdrawing it, after passage through the cake, from the interior of adjacent leaves.

4. A filter press for separating solids from liquids adapted to permit washing the separated solids in situ, comprising two horizontal cylindrical shell sections closed at their remote ends and slidably supported upon a stationary base, a stationary midsection forming a common closure for the adjacent open ends of said section, mechanical means for effecting lateral movement of the movable shell sections during closing and opening of the press, means for locking said sections in a closed position, a hollow rotatable shaft extending axially through the sections and projecting through stuffing boxes provided in the remote ends of the movable shell sections, means for rotatably supporting said shaft, hollow filter leaves rigidly secured to the shaft at their centers and spaced a short distance apart, means for rotating said hollow shaft and filter leaves attached thereto during filtration and filter cake washing, conduits communicating between the interior of the shaft and the interior of the leaves adapted to form a filtrate discharge therefrom, a pipe extending axially through the hollow shaft and integrally supported therewithin, conduits communicating between said pipe and the interior of alternate leaves adapted to conduct washing liquid thereto, means for withdrawing filtrate from the interior of the leaves through the hollow shaft during filtration, means for introducing washing fluid to the pipe within the shaft during cake washing, and means for withdrawing the washing liquid, after passage through the cake, from the interior of adjacent leaves.

5. A filter press for separating solids from liquids and adapted to permit washing the separated solids in situ, comprising two horizontal cylindrical shell sections closed at their remote ends and slidably supported upon a stationary base, a stationary midsection forming a common closure for the adjacent open ends of said section, mechanical means for effecting lateral movement of the movable shell sections during closing and opening of the press, means for locking said sections in a closed position, a hollow rotatable shaft extending axially through the sections and projecting through stuffing boxes provided in the remote ends of the movable shell sections, means for rotatably supporting the hollow shaft near its remote ends and exterior of the shell sections; a fixed bearing at the midpoint of said shaft adapted to support the shaft and prevent lateral movement thereof, hollow filter leaves rigidly secured to the shaft at their centers and spaced a short distance apart, means for rotating said hollow shaft and filter leaves attached thereto during filtration and filter cake washing, conduits communicating between the interior of the shaft and the interior of the leaves adapted to form a filtrate discharge therefrom, a pipe extending axially through the hollow shaft and integrally supported therewithin, conduits communicating between said pipe and the interior of alternate leaves adapted to conduct washing liquid thereto, means for withdrawing filtrate from the interior of the leaves through the hollow shaft during filtration, means for introducing washing fluid to the pipe within the shaft during cake washing, and means for withdrawing the washing liquid, after passage through the cake, from the interior of adjacent leaves.

6. A filter press for separating solids from liquids and adapted to permit washing the separated solids in situ, comprising two horizontal cylindrical shell sections closed at their remote ends and slidably supported upon a stationary base, a stationary mid-section forming a common closure for the adjacent open ends of said section, mechanical means for effecting lateral movement of the movable shell sections during closing and opening of the press, means for locking said sections in a closed position, a hollow rotatable shaft extending axially through the sections and projecting through stuffing boxes provided in the remote ends of the movable shell sections, means for rotatably supporting said shaft and adapted to prevent lateral movement thereof, hollow filter leaves rigidly secured to the shaft at their centers and spaced a short distance apart, means for rotating said hollow shaft and filter leaves attached thereto during filtration and filter cake washing, conduits communicating between the interior of the shaft and the interior of the leaves adapted to form a filtrate discharge therefrom, a pipe extending axially through the hollow shaft and integrally supported therewithin, conduits communicating between said pipe and the interior of alternate leaves adapted to conduct washing liquid thereto, means for withdrawing filtrate from the interior of the leaves through the hollow shaft during filtration, means for introducing washing fluid to the pipe within the shaft during cake washing, means for withdrawing the washing liquid, after passage through the cake, from the interior of adjacent leaves, and mechanical means for removing the cake from the filtering surfaces.

FRANCIS X. GOVERS.